United States Patent [19]

Jones, Jr.

[11] Patent Number: 4,476,536
[45] Date of Patent: Oct. 9, 1984

[54] DIGITAL SINE WAVE SYNTHESIZING METHOD AND APPARATUS

[75] Inventor: Gardner D. Jones, Jr., Raleigh, N.C.

[73] Assignee: International Business Machines Corporation, Armonk, N.Y.

[21] Appl. No.: 331,499

[22] Filed: Dec. 17, 1981

[51] Int. Cl.$^3$ .......................... G06F 15/34; G06J 1/00
[52] U.S. Cl. ..................................... 364/721; 364/607
[58] Field of Search ........................ 364/721, 607, 608

[56] References Cited

U.S. PATENT DOCUMENTS

| | | | |
|---|---|---|---|
| 3,506,810 | 4/1970 | Katell | 364/608 |
| 3,513,301 | 5/1970 | Howe | 364/608 |
| 4,346,448 | 8/1982 | Insam et al. | 364/721 |

OTHER PUBLICATIONS

IRE Transactions on Electronic Computers, Mar. 1, 1956, Harris, J. N., "A Programmed Variable Rate Counter for Generating the Sine Function", pp. 21–26.

Primary Examiner—Felix D. Gruber
Assistant Examiner—Oleg Schatoff
Attorney, Agent, or Firm—Edward H. Duffield

[57] ABSTRACT

A simple method and apparatus for generating approximate sine waves is described. A digital accumulator or adder is driven at a basic counting rate to accumulate increments representative of phase with the total sum representative of total phase angle of a sine wave. The output is periodically sampled and the value is converted into an analog output voltage in a normal D to A converter. A straight line ramp voltage approximation to the sine wave function is created as the result. The accumulator operates in this fashion until a total phase angle of approximately 45° is accumulated. Then accumulation value additions are then accorded ½ their usual significance until 67½° of total phase angle are accumulated. Then accumulation is then at ¼ the basic significance accorded to increments until 90° is reached. The symmetry of the sine wave allows the 0° through 90° samples to be used to generate the full 360° wave form by simple inversion or reverse counting of the counter and inversion of the algebraic sign as necessary. A binary slope approximation to the sine function is achieved by this technique. A series of straight line slopes with a slope of 1, ½ and ¼ are utilized to approximately track a true sine function. The breaks in slope occur in a binarily related fashion to a 90° quarter cycle at 90°/2 and at 90°/4. These simple binary relationships allow the sine function to be approximated very easily by discrete logic and simple binary counters or parallel adders or by the equivalent counting in registers of a microprocessor. The resulting output is applied to a D to A converter to derive the output analog voltages.

4 Claims, 5 Drawing Figures

DIGITAL SINE WAVE SYNTHESIZING METHOD AND APPARATUS

FIELD OF THE INVENTION

This invention relates to sinusoidal wave form or tone generators in general. In particular it relates to digital synthesis systems for sine waves in which digital samples are converted to analog approximations of portions of the sine wave function.

BACKGROUND

In digital systems, the need often arises for generating sine wave voltage or sinusoidal tones. Systems employed in telephone line switching, modems, telecommunications in general and various instruments all require the synthesis of sine waves. Digital synthesis of sine waves is a well developed field. An early paper by Tierney et al, titled, "A Digital Frequency Synthesizer," appearing in IEEE Transactions of Audio Electroacoustics, Vol. AU-19, pg. 48, 1971 is an example. Later work by Wittman et al appearing in the IEEE Transactions on Acoustics Speech and Signal Processing, Vol. ASSP-27, No. 6, Dec. 1979, pg. 804-809, clearly shows a variety of digital sine wave approaches.

The general techniques that these investigators have explored has become the usual method of tone generation and is widely employed. This technique, as described in the later referenced work by Wittman, is based on the accumulation of a digital representation of phase angle increments followed by conversion of the phase to a digital signal representing the sine of the phase angle by means of a table look-up procedure. The digital value which is applied to the accumulator each sampling interval is proportional to the frequency of the sine wave generated. An analog sine wave output is derived from the digital sine values by conventional D to A conversion techniques. Any frequency of sine wave can be generated and the precision with which the tone or the wave form is generated is expressed in terms of signal to noise ratio and phase jitter at the synthesizer analog voltage output.

In a typical application such as that described in the later referenced work by Wittman et al above, the accumulator has a width of 12 bit in digital form. The read only storage table which contains the sine values has 10 bits wide addressability, each address containing a sample of 8 bits in binary length as the digital sine value for a specific 10 bit address input. Such an application clearly requires at least a 1024 by 8 bit table for the sine function values. This is a considerable portion of the overall synthesizer's complexity. Further, as greater frequency resolution is required, the number of accumulator bits must be increased because the sampling frequency cannot be made less than twice the highest known to be generated as is known from the Nyquist theory. With larger accumulator bit strings, the phase noise can be further reduced if the number of address bits in the ROS table which contains the sine values can be increased. This, of course, requires a still larger table and concommittant result of greater complexity and cost.

OBJECTS OF THE INVENTION

In view of the foregoing difficulties with known prior art, it is an object of this invention to provide an improved approximate sine wave generator means and method which does not require sine value storage tables and which can be implemented in simple, standardly available logic components.

SUMMARY OF THE INVENTION

The foregoing and other objects of the invention not specifically alluded to are met in a simple fashion by providing an accumulator whose input is fed a digital value of a selected step size increment at the sampling clock rate. The total binary value accumulated is associated as a phase angle for the rotating vector format of representation of a sine wave. The frequency of the basic sampling clock and the incremental value fed to the adder input of the accumulator determine the frequency of the sine wave function to be approximated. The output of the accumulator is connected to the sine approximation circuit. By means of simple digital operations, such as shifts and adds, this approximation circuit converts the digital phase signal to a straight line approximation of a sine of phase signal.

The sine approximation is based on using binary relations between the straight line segments and the angle values where the segments begin and end. The approximation circuit employs a slope of 1 for angles up to 45°. In this case, the output of the accumulator which is a digital representation of phase is used directly as the sine of phase value. From 45° to 67½° the sine approximation employs a slope of ½. The third slope in the approximation is ¼ and is used in the phase angle range of 67½° to 90°. For angles between 90° and 180°, the approximation employs the quarter cycle symmetric which allows the sine of 90°+θ to be generated at 1−sin θ. Angles between 180 and 360 are simply the sign inverse for angle 0°−180°.

Of particular significance in the present invention is the ease of which the straight line slope approximations of 1, ½ and ¼ can be generated in a binary manner by shifting the digital phase signal accumulation total. The changes in slope values also occur in a binarily related fashion to the 90° quarter cycle of the wave and occur at 90°/2 and 90°/2+90°/4. Such relationships allow the sine value approximation to be easily generated by simple digital logic or to be programmed in a microprocessor. At every output from the approximation circuit, an output sample of the digital number can be converted into an analog voltage to generate the step wise approximation to the sine function. By simply adding an extra left or right shift in a binary number, the basic weight or value can be halved or doubled as is well known. The basic approximation inherent in this technique is that the sine of an angle is approximately the same as the angle itself from 0° through 45°, is approximately the same as the angle plus ½ the difference beyond 45° up to 67½°, and is approximately the same as that slope plus ¼ of the difference beyond 67½°. Viewed alternately, the straight line slope approximations to the sine wave have a slope of 1 from 0° to 45°, ½ from 45° to 67½°, and ¼ from 67½° to 90°.

As with the usual prior art table look up approaches, only the first quarter cycle of this sine wave need actually be defined since ¼ cycle and ½ cycle symmetry properties can be employed to construct the remaining portions of the wave form.

The invention will be described with reference to an illustrative preferred embodiment thereof and illustrated in the drawing as follows.

DETAILED SPECIFICATION

Figure 1:
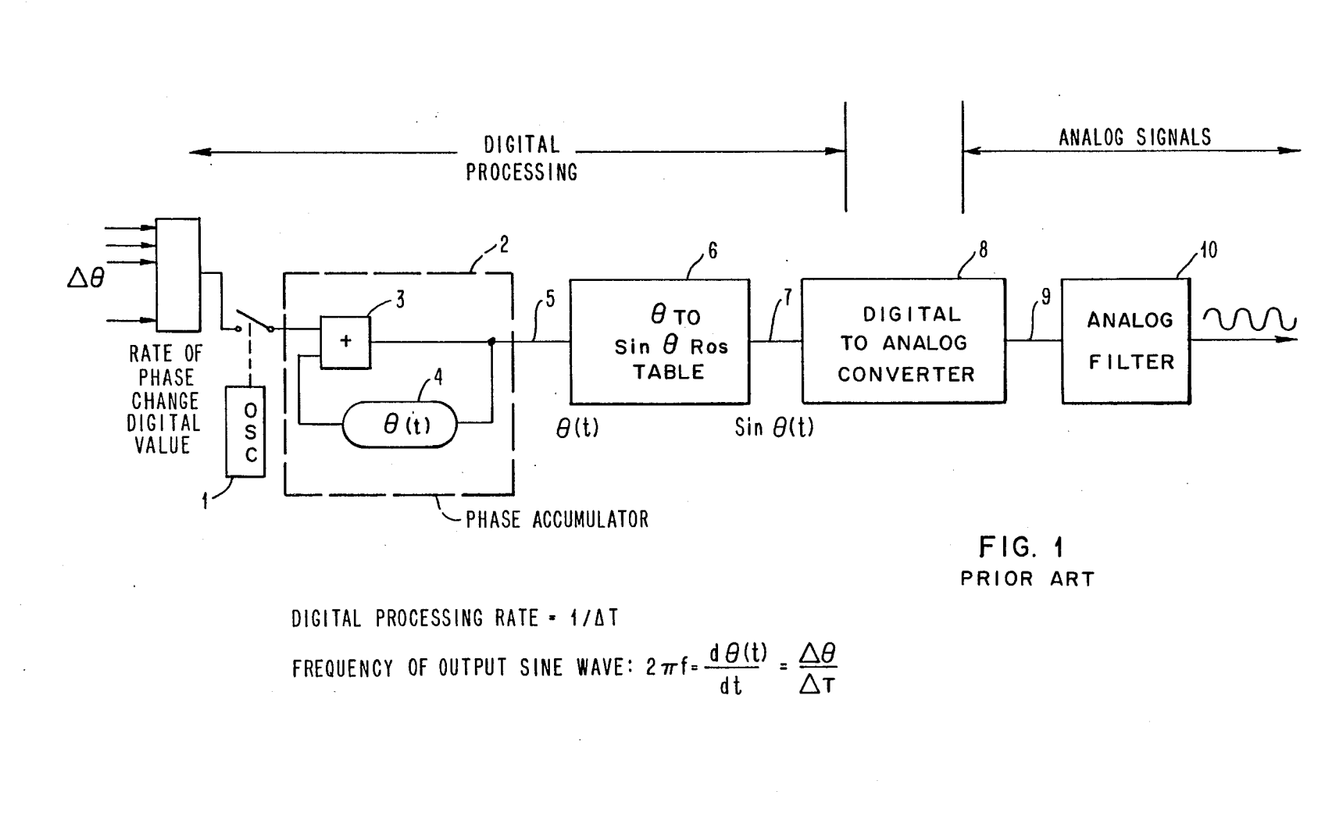
FIG. 1 illustrates a schematic diagram of a conventional form of known prior art digital sine wave synthesizer apparatus using a sine value ROS table look up procedure.

Turning to FIG. 1, the usual prior art approach to digital synthesis of analog sine waves is schematically shown. The basic method employed is that a digital value representing incremental phase samples at a fixed frequency is applied to a phase accumulator 2 comprising an adder 3 and a feedback 4 for producing a sum on the output line 5. This sum instantaneously represents a summation of phase increment changes in an assumed sine function.

The frequency F is defined by the formula $$F = \Delta\theta f_s / 2^N$$

where $\Delta\theta$ is the size of the increment of phase, $f_s$ is the rate of sampling the sum and $2^N$ is 2 to the N where N is the number of bits in the digital sample; for example, 12 bits as used frequently in the prior art.

Each digital value applied to the accumulator 2 is representative of a new increment of angular position in a typical rotating vector phase representation of a sine wave. The sum on the output 5 is utilized as an address for entering a sine value table, usually in read only storage or other similar memory device illustrated typically as a sine table 6.

The values in the ROS sine table 6 represent the value of the sine function as a function of angle $\theta$. These are normally represented in binary fashion, but may be hexidecimal or any other digital format. These outputs appear on line 7 in sequence with each new increment in the accumulator 2. In the usual embodiment, the outputs would be in straight binary or 2's complement coded form for application to the D to A converter 8.

The D to A converter 8 is well known in the industry and takes the digital values presented at its input and converts them into a ramp output voltage of the magnitude determined by the digital input. Filtering in an analog filter circuit removes the sampling frequency or noise and smooths the result to recreate a schematically shown analog sine wave output.

The processing rate at which the phase increment $\Delta\theta$ is fed to the accumulator 2 determines the frequency of the output sine wave by the well known formula $D\theta/Dt$ is equal to $\Delta\theta/\Delta t = 2\pi f$ where $\Delta t$ is the interval at which the accumulator is updated.

As pointed out in the prior art statement above, while this type of system is effective, it is also cumbersome and more complex than is desired due to the considerable cost of the expensive sine value table required. A much simpler, though perhaps not as precise an approximation to a sine function can be achieved by the present invention.

Figure 2:
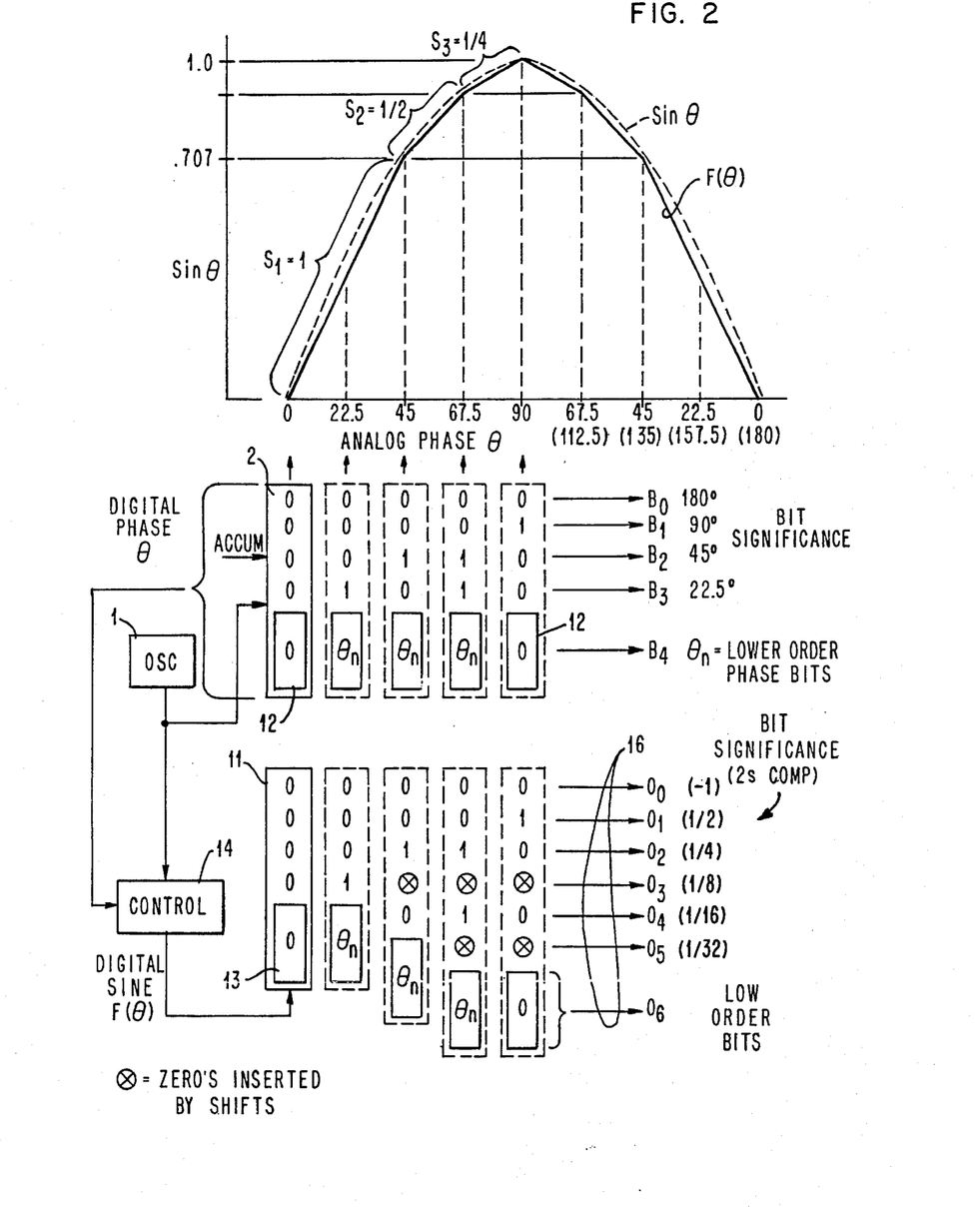
FIG. 2 illustrates the principles of this preferred embodiment of the present invention.

Turning to FIG. 2, there is shown in the uppermost portion of the figure a 180° portion of a typical sine wave shown in dashed lines. In straight lines, are shown the slope-wise approximation of the sine function achieved by the present invention. The wave and the approximation are plotted on a chart of sine $\theta$ on the ordinate and phase angle $\theta$ on the abcissa. Various slopes in the approximation to the sine wave are shown as slopes s1, s2, and s3.

Beneath the upper portion of FIG. 2 there is shown a phase accumulator 2 of similar form to that shown in FIG. 1. The accumulator 2 is only shown schematically as a binary register or counter having four high order stages and a number (which may be arbitrary) of lower order bit positions identified by the small box 12 within the accumulator 2. The accumulator 2 has a content of 0 at the time the analog phase angle is 0 and the sine is, of course, 0. At 22½° of phase angle in FIG. 2, the content of the accumulator 2 is shown immediately below the 22½° point. It may be seen that the least significant high order bit $B_3$ has a value of 22½° as shown by the value table to the right of the accumulator drawing. Each successively higher order bit position in the accumulator is binarily related. Therefor, the third order bit $B_2$ has a significance of 45° analog phase, the second order bit $B_1$ a 90° meaning, and the first order bit $B_0$ a 180° value. Oscillator 1 specifies the rate at which accumulator 2 is updated by the phase increment $\Delta\theta$. Accumulator 2 is connected to the sine approximation circuit 11. The output of 11 contains the bit significance shown except for the low order bit positions labeled in box 13. The operation of the sine value approximation circuit 11 will be described below.

The approximation employed in the present invention is a straight line, straight slope sine wave approximation for the first 45° having a slope of 1. This is to say that the value of the phase angle $\theta$ relative (expressed in digital form with bits given the significance and relative weights as shown in the lower portion of FIG. 2 of 1/32, 1/16, ⅛, etc.) represents the sine itself. However, at the 45° phase point in the top portion of FIG. 2, the slope of the approximating function is changed to a slope of ½. This is accomplished as shown in the bottom portion of FIG. 2 by arbitrarily adding an extra 0 by a right shift in the sine approximation circuit 11. This is shown in the third array appearing in the bottom portion of FIG. 2 aligned with the 45° point of the top portion in the curve of FIG. 2. This shift adds an extra position in the higher order bit positions in the output of approximation circuit 11 and has the effect of halving the rate at which those high order bits will be advanced due to the input of successive values of $\Delta\theta$ to accumulator 2. The control means 14 causes the additional shift in response to monitoring the net accumulated value in the accumulator 2. When the value 0010 is reached, reading from top to bottom in the third position for the digital phase angle accumulation in accumulator 2, the 45° phase angle has been reached.

Another similar change in slope occurs at the 67.5° phase angle where the slope is changed to ¼. The bottom portion of FIG. 2 shows the effect of the additional shift and, of course, has the effect of cutting the advance rate in the higher order bit positions in the output of approximation circuit to ¼ that of the accumulator 2. The output bit positions ($O_0, O_1 \ldots O_6 \ldots$) in the output of circuit 11 are assigned the significance shown in the table to the right of the accumulator representation in FIG. 2. These bits given this weighting are outputted to a D to A converter, not shown, to create an analog step voltage level of proportionate magnitude. The net result is that at each increment the output of approximation circuit 11, a new total digital output value for the sine function is fed to a D to A converter and another step wise increment is added to the straight line approximations for the sine function as shown in the top of FIG. 2.

For angles in the range 90°–180°, the same approximation can be used by utilizing the quarter cycle symmetry properties of sine function. This is done by observing that sine $(90 + \theta)$ is the same as $1 - \text{sine } \theta$. The approximation circuit performs the operations $1 - \text{sine } \theta$ using the linear segments to generate sine $\theta$ as described above.

For angles in the range 180° to 360°, the same operations are used as for 0° to 180° with the exception that the sign bit (180° weighting) is changed on the input to the DAC.

It may be noted in FIG. 2 that the slope wise approximation occurs in a binary fashion related to the analog phase angle. The first slope is one to one and is equivalent to the statement that the sine of the angle is the angle itself, a crude but functional approximation. At 45° and up until 67½° which are the ½ of a 90° and ½ plus ¼ of a 90° phase points, a slope approximation of ½ is used. From the ½ plus ¼ wave position at 67½° up to 90°, the slope is ¼. Simply put, the slope is halved at the half way point between 0° and 90° (at 45°) and halved again at the half way point between 45° and 90°. This simple approximation by a straight line slope can be easily accomplished in normal digital logic or in microprocessor driven register space as will be seen later.

As with any function approximation, some distortion will be introduced. A Fourier analysis of the present binary sine wave approximation technique shows that it will generate a frequency spectrum having the following components.

$$An = \frac{2}{n^2}(1 - (-1)^n)\left(1 + \frac{n\pi}{8} + 2\cos\frac{n\pi}{4}\right) \quad \text{Eq. 1}$$

Only the odd harmonics are generated and their levels relative to the fundamental frequency are given as follows.

| Term n | $A_n$ relative level in db. |
|---|---|
| 1 | 0 |
| 3 | −59.6 |
| 5 | −40.4 |
| 7 | −40.8 |
| 9 | −45.2 |
| 11 | −54.1 |

Figure 5:
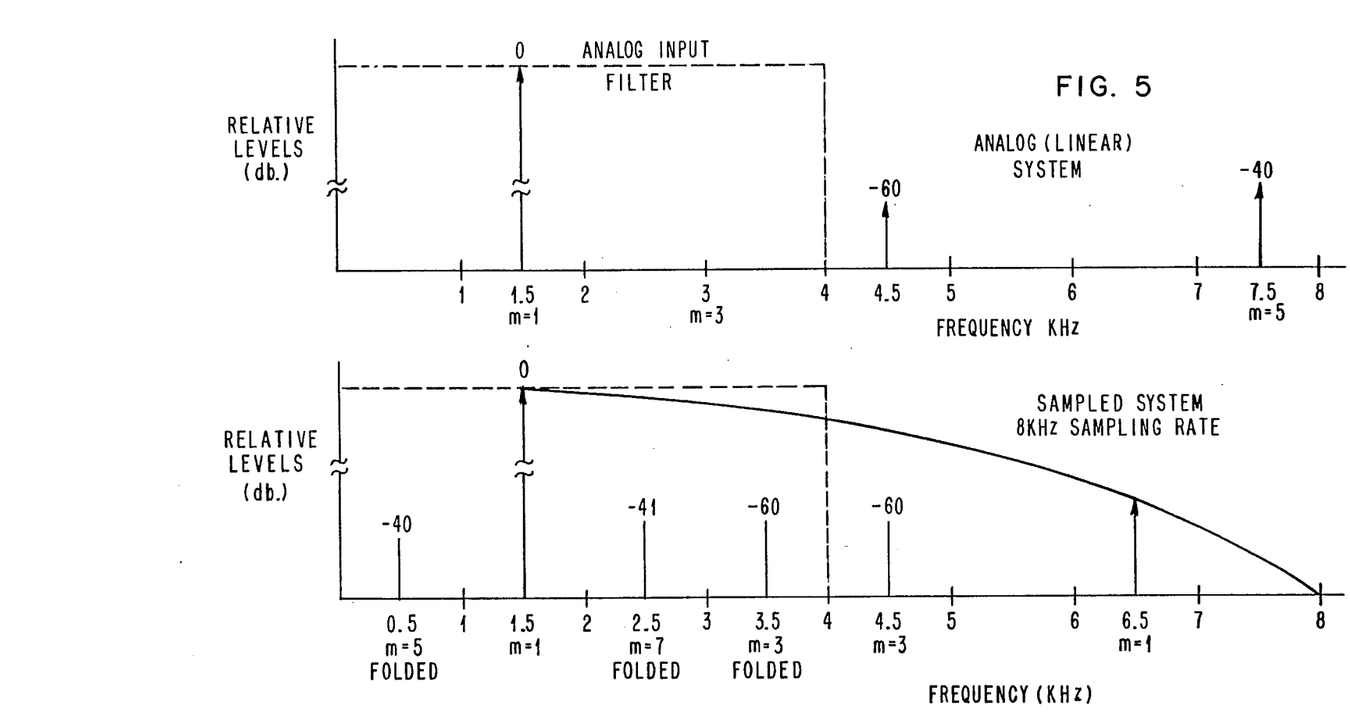
FIG. 5 illustrates in approximate analog form the harmonics and noise generated by the apparatus using this technique.

As seen from the table above, the harmonic distortion components are within general requirements for conventional telecommunications applications where relative noise should be at least 20 to 40 db below the signal. The sine approximation employed creates harmonics that increase the effective bandwidth of the tone that is synthesized by creating the sine wave. In a linear system, most of these components would fall outside of the band employed in telecommunications (300 to 3,000 hertz). However, since the synthesizer is a sampled data system, the increased bandwidth will result in some of the harmonic components being folded back in frequency to the signal band due to the well known aliasing phenomenon. FIG. 5 illustrates the mechanism for an 8 kilohertz sampling rate as compared against the linear analog system for a 0 db input signal at 1.5 kilohertz. As seen in the table above, the even order harmonics do not appear since they are not present in the Fourier analysis shown in Eq. (1). The odd harmonics are shown for $n=3$, $n=1$, $n=5$ and $n=7$ in the lower portion of FIG. 5.

Figure 3:
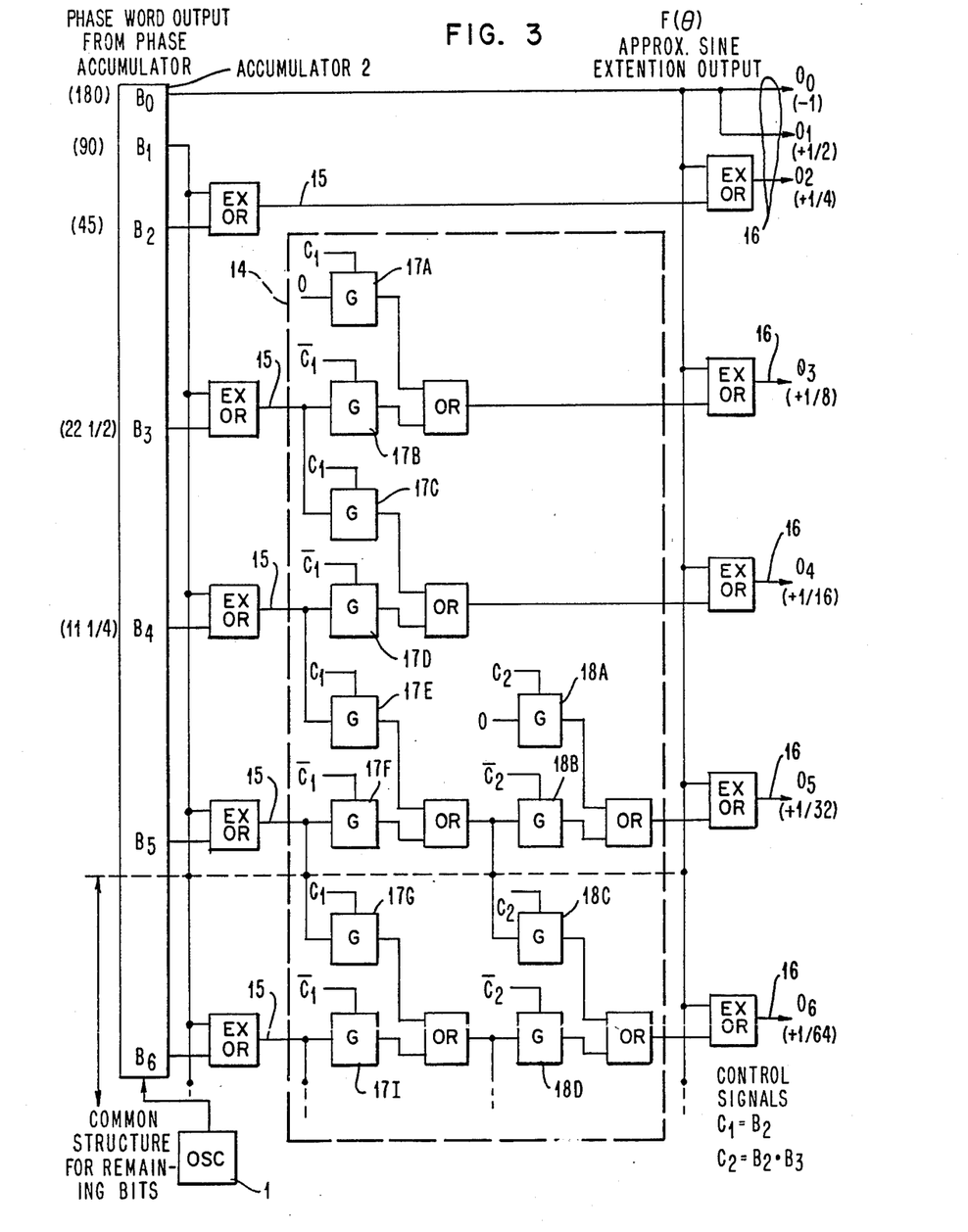
FIG. 3 illustrates a preferred embodiment of the invention as a conventional logic and gating diagram for a circuit to perform the functions for creating a string of digital sine values for conversion in conventional means to an analog output.

Turning to FIG. 3, a circuit diagram for the sine wave digital value approximation generation is illustrated. The output from the phase accumulator 2 is applied as the input represented as bit weighting $B_0, B_1 \ldots B_6$, etc. The output of the approximation circuit is given by bits $O_0, O_1 \ldots O_6$, etc., and have the bit significance given in the bottom of FIG. 2 besides output line 16.

The control means 14 illustrated in FIG. 2 is integrated into the structures 17, 18 shown in FIG. 3 where control signals are derived as shown. C1 is generated when bit position B2 in accumulator 2 is on. This additional line is not shown but its connection to the various gate circuits 17A–17I are indicated schematically either as the presence of the signal or the absence of it where there is a small bar above the C1. A second control signal C2 is generated when both bit position B2 and B3 are on which is equivalent to the 67½° total phase angle accumulated in accumulator 2. This control signal is applied to the series of gates 18A–18D with either the presence or absence of the control signal C2 indicated as shown.

The function of the control circuit 14 in FIG. 3 is to accomplish the bit shifts necessary to construct the slope approximation described in FIG. 2 given the key angle break points 45 and 67½ debated by control signals C1 and C2, respectively.

The necessary computation to cover angles in the range 90° to 180° is accomplished by the Exclusive OR 15 of bit B1 (90°) with the remainder of the phase bits $B_2, B_3, \ldots B_6$. This is equivalent to the mathematical operation sine $\theta = 1 -$ sine $(\theta - 90)$ and is employed whenever B1=1 indicating that the phase has exceeded 90°. This is equivalent to taking the "1s" complement of the angle and adding it to the 90° weight (B1). Note that the $B_0$ bit (180°) is fed directly to the D to A converter. For angles in the range 180° to 360°, the same approximation is used for the range 0°–180° with the exception that the sign bit is changed on the output of the approximation circuit.

It will be noted that in operation of the circuit shown in FIG. 3, if bit 6 is on, the output will be fed directly through to the output 16 so long as bit 2 is not on. Once bit 2 is on, the gates 17A-I effect a one stage shift to half the significance for the lower order bits. When both bits 2 and 3 are on, a similar additional shift occurs by means of gates 18A–D appropriately conditioned as shown. Approximation circuit 11 including the control circuit structure of the multiple gates 17 and 18 provides its outputs on lines 16 to a D to A converter, not shown.

D to A converters are conventional in the art and need not be further described. However, the weighting of the bits appearing on line 16 has been selected to follow the weighting given in FIG. 2. As will be understood by those of skill in the art, this digital output on line 16 can be utilized in a circuit configured like that shown in FIG. 1 as the output that would appear in FIG. 1 on line 7 from a typical ROS sine table.

Figure 4:
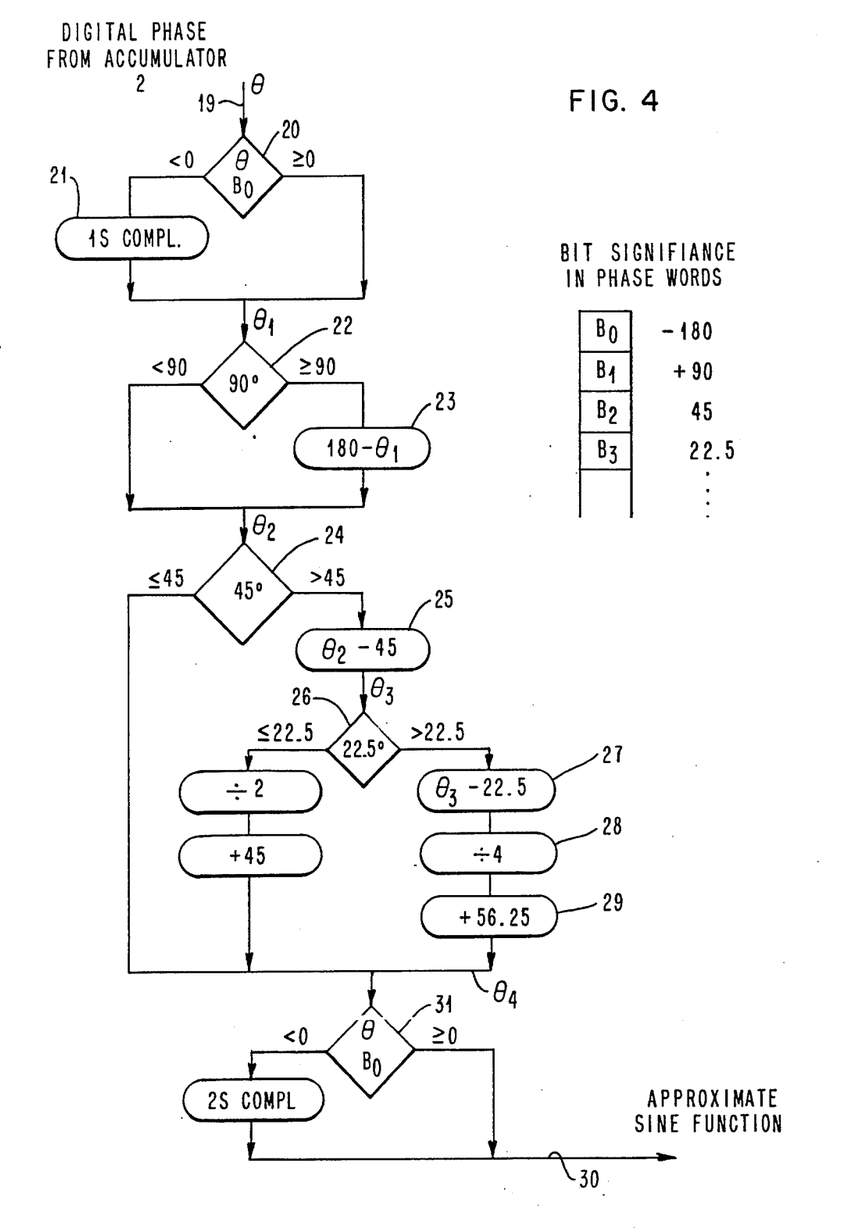
FIG. 4 illustrates logical flow chart schematic for this method as may be practiced by a processor to create the stream of digital sine function approximations in response to a basic count accumulated in an accumulator.

FIG. 4 shows an alternative embodiment for the digital sine value to voltage generator structure. The input to this structure is the digital phase angle bit word that would come from an accumulator 2 driven by an oscillator 1 in similar fashion to that shown in FIG. 2. The bit words for phase angle and their significance would be the same as shown in FIG. 2. This digital phase accumulated in accumulator 2 is applied at point 19 to a comparator 20 having a range from 0° to 180°. The incoming phase value of $\theta$ is compared against 0 in comparator 20 and if less than 0 (i.e., negative), the 1's complement is created in complementer 21 and a new representation for the accumulator phase $\theta$ is shown as $\theta_1$ at the input to comparator 22. Comparator 22 compares input $\theta_1$ against 90° and if the input angle is greater than 90°, subtractor 23 subtracts the angle from 180°. This is the equivalent to reversing the count direction as will be readily appreciated, since a 91° angle input will result in an 89° output as $\theta_2$ from the subtractor 23. This is the same as saying 1° more than 90° is converted into 1° less than 90° by the subtractor 23 and is equivalent to a reverse counting direction. This is necessary as may be seen in FIG. 2 to reverse the effect of the slope approximation from 90° moving toward 112.5° in the top portion of FIG. 2. The resulting output $\theta_2$ is tested in comparator 24 against a 45° value and, if the angle $\theta_2$ is more than 45°, 45° are subtracted in subtractor 25 resulting in an output angle $\theta_3$.

The output $\theta_3$ is compared in comparator 26 against a 22½° value and if $\theta_3$ is greater than 22½°, 22½ more degrees are subtracted in subtractor 27 and the resultant angle value is divided by 4 in divider 28 and that is summed with 56.25, (the ½+¼ of a wave length in degrees) in an adder 29 to achieve the final resultant output if $\theta_4$ is greater than 0 on the output line 30. The comparator 31 tests $\theta_4$ against 0 to accomplish this result.

The net result of the circuit shown in FIG. 4 is to generate on line 30 a digital representation representative of the phase angle itself from 0° to 45°, the phase angle itself plus ½ the difference between the angle and 45°, between 45° and 67½°, and that resultant angle plus ¼ of the difference between that angle and 90° when the phase input angle is greater than 67½°. The flow diagram of this method as shown in FIG. 4 can be implemented easily using a microprocessor and working registers as will be readily appreciated by those of skill in the art. The binary digital representations can be given the same weighting as those shown in FIG. 2 and the effect of the binarily decreasing weighting given to further phase angle increments beyond 45 and beyond 67½° is easily implemented as shown in FIG. 4 either as division by 2 or as division by 4 as appropriate. As will be readily appreciated, these divisions are nothing more than rightward shifts in a binary shifting register by one or two places, respectively.

Multi-tone signals can be synthesized utilizing this technique but employing the additional structure shown in the diagrams in the aforenoted reference by Wittman et al, as will be readily appreciated by those of skill in the art.

As may be seen from the foregoing description, what the present invention accomplishes is a significant reduction in complexity and cost of the sine wave generation circuits. It is true that the resulting sine wave is only an approximation to a true sine function, but as pointed out in the discussion relative to FIG. 5, the distortion inherent in the technique is well within the limits of telecommunication signal quality. The simplicity of the binary slope approximation discovered and embodied in the apparatus as shown in FIG. 2 for example, leads to an easily implemented and low cost sine wave generator that does not require the use of extensive memory tables or even complex processor or digital processing capability. Hence, a convenient sine wave tone generator has been disclosed and developed for general use in telecommunications systems, instruments and the like that represents a distinct improvement over the cumbersome and expensive table look up advanced in the known prior art.

Therefore, having described my invention with reference to a preferred embodiment thereof, it will be appreciated that the stepwise straight line slope approximation technique and the apparatus for carrying out the technique represent a distinct advance in the art for which protection is sought by Letters Patent as defined in the following claims.

I claim:

1. Apparatus for generating analog sine wave functions, comprising:
   a source of digital values representive of phase angle increments;
   a clocking means connected to said source for clocking out to an accumulator said digital values at a fixed clocking rate;
   a digital binary accumulator connected to said clocking means for accumulating said digital values;
   a sine approximation means connected to said accumulator for converting said digital values to digital representations of a sine function;
   a control means connected to said accumulator and to said sine approximation means, respectively, for altering the approximation value of the output of said sine approximation means in response to the total accumulated value occurring in said accumulator by reducing the significance accorded by said approximation means to the further increments to the low order bits of said accumulator to one-half their normal value when a combined 45° phase value accumulation appears in said accumulator and by further altering said output of said sine approximation means by reducing the value accorded to additional increments to the output of said accumulator by said sine approximation means when the accumulated phase value in said accumulator is 67½°; and
   means for reversing said accumulator's modification sequence and direction every 90° of accumulated phase value;
   means connected to said sine approximation means for converting the output value in said approximation means to a step wise analog output voltage approximating a sine wave function.

2. Apparatus as described in claim 1, wherein: said sine approximation means comprises a binary shift register means connected to said accumulator to receive the output therefrom and to change the significance accorded to additional increments occurring in the accumulator output by shifting the content of the low order bit positions one stage lower.

3. A method of approximating a digital sine function comprising steps of:

supplying at a fixed rate digital values representative of phase angle increments;

accumulating phase angle increments in an accumulator;

converting the output of said accumulator to a value representative of sine on a one for one basis until a 45° total accumulated phase angle has occurred, halving the significance of the output of the lower order bits thereafter until a total accumulated phase angle of 67½° has occurred and then halving the significance of the output of the low order bits again until a 90° total accumulated phase angle is reached.

4. A method as described in claim 3, further comprising a step of:

converting said accumulated phase angle increments to an analog voltage level.

* * * * *